United States Patent

Chen et al.

Patent Number: 5,990,627
Date of Patent: Nov. 23, 1999

[54] HOT RELIGHT SYSTEM FOR ELECTRODELESS HIGH INTENSITY DISCHARGE LAMPS

[75] Inventors: Jian J. Chen, Beverly; A. Bowman Budinger, Westford; Walter P. Lapatovich, Boxford, all of Mass.

[73] Assignee: Osram Sylvania, Inc., Danvers, Mass.

[21] Appl. No.: 08/728,571

[22] Filed: Oct. 10, 1996

[51] Int. Cl.⁶ .................................................. H05B 41/36
[52] U.S. Cl. ........................ 315/117; 315/149; 315/309; 315/248; 313/234; 313/607
[58] Field of Search .................. 313/234, 607; 315/248, 344, 309, 149, 117, 112, 307; 362/264

[56] References Cited

U.S. PATENT DOCUMENTS

| | | | |
|---|---|---|---|
| 2,279,941 | 4/1942 | Dunham et al. | 315/117 |
| 4,146,819 | 3/1979 | Hunter | 315/117 |
| 4,978,891 | 12/1990 | Ury | 315/248 |
| 5,070,277 | 12/1991 | Lapatovich | 315/248 |
| 5,113,121 | 5/1992 | Lapatovich et al. | 315/248 |
| 5,130,612 | 7/1992 | Lapatovich | 315/248 |
| 5,144,206 | 9/1992 | Butler et al. | 315/248 |
| 5,241,246 | 8/1993 | Lapatovich et al. | 315/248 |
| 5,287,039 | 2/1994 | Gregor et al. | 315/248 |
| 5,334,913 | 8/1994 | Ury et al. | 315/248 |
| 5,404,076 | 4/1995 | Dolan et al. | 313/572 |

*Primary Examiner*—Arnold Kinkead
*Attorney, Agent, or Firm*—Carlo S. Bessone

[57] ABSTRACT

An electrodeless high intensity discharge lamp includes an electrodeless lamp capsule having an enclosed volume containing a mixture of starting gas and chemical dopant material excitable by high frequency power to a state of luminous emission, an applicator for coupling high frequency power to the lamp capsule, a gas nozzle directed toward the lamp capsule and a gas controller coupled to the gas nozzle. The gas controller receives gas from a gas source and supplies a gas puff of limited duration to the lamp capsule through the gas nozzle in response to termination of the state of luminous emission. The lamp capsule is rapidly cooled by the gas puff to a temperature required for restart.

20 Claims, 8 Drawing Sheets

HOT RELIGHT SYSTEM FOR ELECTRODELESS HIGH INTENSITY DISCHARGE LAMPS

FIELD OF THE INVENTION

This invention relates to electrodeless high intensity discharge lamps and, more particularly, to a hot relight system wherein a gas puff is utilized to rapidly cool an electrodeless lamp capsule to a temperature required for restart.

BACKGROUND OF THE INVENTION

Electrodeless high intensity discharge (HID) lamps have been described extensively in the prior art. In general, electrodeless HID lamps include an electrodeless lamp capsule containing a volatilizable fill material and a starting gas. The lamp capsule is mounted in a fixture which is designed for coupling high frequency power to the lamp capsule. The high frequency power produces a light-emitting plasma discharge within the lamp capsule. Recent advances in the application of microwave power to lamp capsules operating in the tens of watts range are disclosed in U.S. Pat. No. 5,070,277, issued Dec. 3, 1991, to Lapatovich; U.S. Pat. No. 5,113,121, issued May 12, 1992, to Lapatovich, et al.; U.S. Pat. No. 5,130,612, issued Jul. 14, 1992, to Lapatovich et al.; U.S. Pat. No. 5,144,206, issued Sep. 1, 1992, to Butler et al.; and U.S. Pat. No. 5,241,246, issued Aug. 31, 1993, to Lapatovich, et al. As a result, compact electrodeless HID lamps and associated applicators have become practical.

The above patents disclose small, cylindrical lamp capsules wherein high frequency energy is coupled to opposite ends of the lamp capsule with a 180° phase shift. The applied electric field is generally colinear with the axis of the lamp capsule and produces a substantially linear discharge within the lamp capsule. The fixture for coupling high frequency energy to the lamp capsule typically includes a planar transmission line, such as a microstrip transmission line, with electric field applicators, such as helices, cups or loops, positioned at opposite ends of the lamp capsule. The microstrip transmission line couples high frequency power to the electric field applicators with a 180° phase shift. The lamp capsule is typically positioned in a gap in the substrate of the microstrip transmission line and is spaced above the plane of the substrate by a few millimeters, so that the axis of the lamp capsule is colinear with the axes of the field applicators.

Electrodeless high intensity discharge lamps have found potential applications, for example, in automotive lighting, surgical lighting, fiber optics illumination and as light sources for matrix projection displays. Their unique properties, derived from the lack of electrodes, make them particularly suitable for applications requiring long life, good lumen maintenance and high color stability. To be commercially viable in many of these applications, electrodeless HID lamps require a method of relighting the lamp upon a momentary loss of power. The loss of power may be due to the operator attempting to quickly relight the lamp or due to a momentary uncontrolled break in the supply of power to the lamp. Consumers expect tungsten light sources to quickly reestablish light output upon reapplication of power, and expect electrodeless HID lamps to do the same.

High intensity discharge lamps suffer from a relighting difficulty after power interruption due to the extremely high vapor pressure of the constituent gases resulting from high lamp temperature. During operation, HID lamp arc tubes operate at temperatures that exceed 750° C. Metal halide lamps, for example, containing mercury exhibit internal pressures that range from 1 to 200 atmospheres. Room temperature pressures inside the arc tube are typically $10^{-5}$ atmospheres of mercury vapor and 1 to 500 Torr of starting gas, typically argon or xenon. The difference is due to the high increase in mercury vapor pressure with arc tube temperature. As pressure inside the arc tube increases, it becomes more and more difficult to start a discharge. This is a particular problem when power is momentarily interrupted. The lamp will not restart until it cools down close to room temperature. Cooling may take up to several minutes, during which no light is emitted from the lamp.

Hot relight has long been an issue with electroded metal halide lamps. In this case, application of extremely high voltage pulses (40 kV) after lamp turnoff produces conditions suitable for a rapid hot relight. Voltage pulses of this magnitude are required to break down the high pressure gas and establish conditions which allow current to flow between electrodes. High voltage is not the only requirement for restarting hot lamps at high pressure. The initial high voltage pulses produce gas breakdown and corona formation from the electrodes. This is followed in time by streamer formation eventually transversing the gap between the electrodes. These are high impedance phases of hot relight. If the power delivered to the electrodes is sufficient and the voltage is high enough, a spark channel is eventually formed, which allows sufficient current flow to eventually reestablish the arc. The spark channel phase is also a relatively high voltage phase but is lower in impedance, therefore requiring higher current from the voltage source. The most common way of producing conditions that ensure hot restart is to generate a long series of high voltage pulses that overvoltage the arc tube and force it to transition through each starting phase until the conventional ballast supply can sustain an arc. A final arc stage is established when sufficient energy is transferred to the electrodes during the spark channel phase.

The generation of sequential high voltage pulses is not trivial. Such an igniter is costly and creates a safety problem. The 40 kV pulses can ionize air, causing electrical failures, destroying CMOS circuitry and presenting a safety hazard for people in contact with the lamp.

Electrodeless HID lamps have no electrodes and therefore provide no way of injecting electrons directly into the arc tube. Hot relight of electrodeless HID lamps can be achieved with high voltage pulses, but these pulses are capacitively coupled to the discharge. The capacitively coupled pulse field and the applied microwave field are required for breakdown and hot relight. Generally, this is an unacceptable approach, since it is difficult to shield the microwave output transistors in the lamp ballast from the high voltage pulse fields, often resulting in the destruction of the output transistors.

U.S. Pat. No. 5,287,039 issued Feb. 15, 1994 to Gregor, et al discloses a slow cool down method of restarting electrodeless HID lamps. The disclosed method allows instant relight at any time after turnoff. This method requires the power system to remain on during the cooling time and covers the situation where the lamp is intentionally turned off and then quickly turned back on. It does not cover the case where total power to the lighting system is momentarily interrupted or removed. Continuous cooling of relatively high power electrodeless discharge lamps during operation is disclosed in U.S. Pat. No. 5,334,913 issued Aug. 2, 1994 to Ury, et al; U.S. Pat. No. 5,404,076 issued Apr. 4, 1995 to Dolan et al and by B. P. Turner, et al in "Sulphur Lamps-Progress In Their Development" Ref. No. 87, 1995 IES Annual Conference, pages 660–672.

SUMMARY OF THE INVENTION

According to a first aspect of the invention, an electrodeless high intensity discharge lamp assembly is provided. The lamp assembly comprises an electrodeless lamp capsule having an enclosed volume containing a mixture of starting gas and chemical dopant material excitable by high frequency power to a state of luminous emission, an applicator for coupling high frequency power to the lamp capsule, a gas nozzle directed toward the lamp capsule and a gas controller coupled to the gas nozzle. The gas controller receives gas from a gas source and supplies a gas puff of limited duration to the lamp capsule through the gas nozzle after termination of the state of luminous emission. The lamp capsule is rapidly cooled by the gas puff to a temperature required for restart.

The gas controller may comprise a gas valve responsive to a control signal and a control circuit for supplying the control signal. The control circuit may include a photodetector for sensing the state of luminous emission and means responsive to the photodetector sensing termination of the state of luminous emission for initiating the gas puff. The control circuit may further include means for terminating the gas puff in response to the photodetector sensing reestablishment of the state of luminous emission.

The gas nozzle is preferably directed toward a region of lamp capsule where the chemical dopant material condenses, such as the bottom of the lamp capsule. The gas puff preferably has a time duration in a range of about 0.5 to 5.0 seconds and a pressure in a range of about 5 to 50 pounds per square inch (psi). The hot relight system of the invention may permit restarting of the lamp capsule in less than one second.

According to another aspect of the invention, a method for facilitating hot restart of an electrodeless lamp capsule is provided. The method comprises the step of directing a gas puff of limited duration toward the lamp capsule after termination of the state of luminous emission. The lamp capsule is rapidly cooled by the gas puff to a temperature required for restart.

BRIEF DESCRIPTION OF DRAWINGS

For a better understanding of the present invention, reference is made to the accompanying drawings, which are incorporated herein by reference and in which.

DETAILED DESCRIPTION

Figure 1:
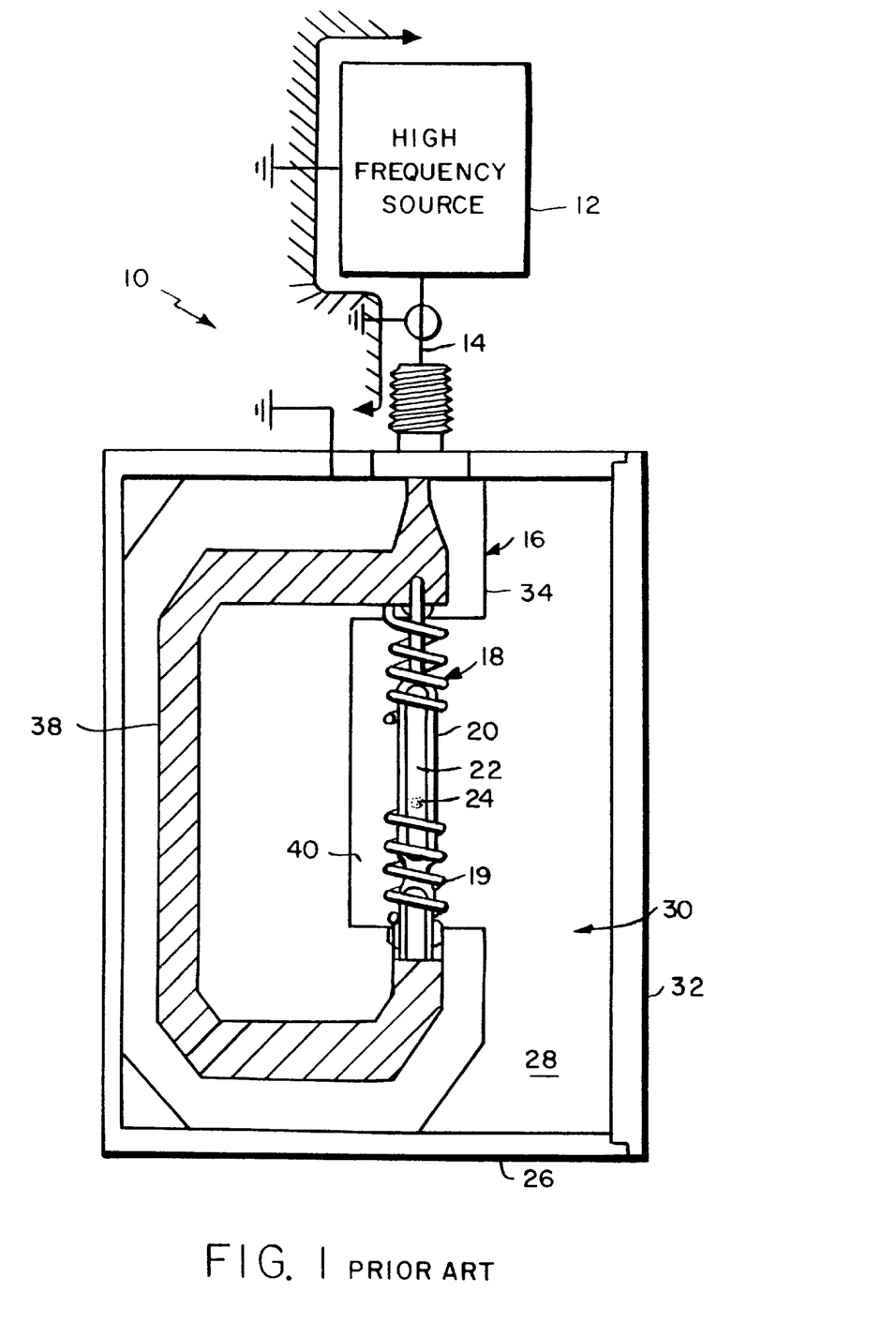
FIG. 1 is a schematic diagram of an electrodeless high intensity discharge lamp assembly in accordance with the prior art.

A prior art electrodeless automobile headlamp system 10 is shown in FIG. 1. The electrodeless headlamp system 10 comprises a high frequency source 12, a transmission line 14, a planar transmission line 16, electric field applicators 18 and 19, and a lamp capsule 20 having an enclosed volume 22 containing a lamp fill material 24. The planar transmission line 16, holding the applicators 18 and 19 and the lamp capsule 20, may be positioned in a reflector housing 26 having a reflective surface 28 defining an optical cavity 30. The optical cavity 30 may be covered by a lens 32.

The planar transmission line 16 includes a substrate 34 having a patterned conductor 38 formed on one surface. The conductor 38 interconnects the transmission line 14 and the electric field applicators 18 and 19. The conductor 38 is designed to provide a phase shift of 180° between applicators 18 and 19 at the frequency of source 12. The opposite surface of substrate 34 is covered with a conductive ground plane (not shown). The substrate 34 is provided with a gap 40 in which the lamp capsule 20 is mounted. Typically, the lamp capsule 20 is displaced from the plane of substrate 34 and is aligned with the electric field applicators 18 and 19.

The lamp capsule 20 is preferably substantially cylindrical in shape with hemispherical ends. The dimensions of the lamp capsule are typically given as (inner diameter×outer diameter×arc length), all in millimeters. Typical lamp capsules range from 1×3×6 millimeters to 5×7×17 millimeters. For operation in the preferred ISM (Industrial, Scientific and Medical) bands centered around 915 Megahertz and 2.45 Gigahertz, the lamps are typically 2×4×10 millimeters and 2×3×6 millimeters, respectively, for best performance. The envelope of the lamp capsule is fabricated of a light-transmissive material through which the high frequency power passes substantially unattenuated. The material of the lamp envelope may be vitreous silica, commonly called quartz, of any grade, but water-free grades are especially preferred. Synthetic fused silica may also be used to fabricate the lamp envelope. When the discharge can be run at lower wall temperatures, the lamp envelope may be fabricated of other glassy material, such as aluminosilicate glass or borosilicate glass.

The lamp capsule is filled with a volatilizable fill material and a low pressure inert gas for starting, such as argon, krypton, xenon or nitrogen in the range of 1 to 100 Torr, with a preferred value of about 15 Torr. The volatilizable fill material, when volatilized, is partially ionized and partially excited to radiating states so that useful light is emitted by the discharge. The fill material can, for example, be mercury and NaSc halide salt, or other metal salts. Other fill materials not containing mercury may also be utilized. When the lamp capsule is operating and hot, the internal pressure is between 1 and 50 atmospheres. Other fill materials known to those skilled in the art may be utilized to generate visible, ultraviolet or infrared radiation.

The electric field applicators 18 and 19 may comprise helical couplers as disclosed in the aforementioned U.S. Pat. No. 5,070,277; end cup applicators as disclosed in the aforementioned U.S. Pat. No. 5,241,246; loop applicators as disclosed in the aforementioned U.S. Pat. No. 5,130,612; or any other suitable electric field applicator. In general, the electric field applicators produce a high intensity electric field within the enclosed volume of the lamp capsule, so that the applied high frequency power is absorbed by the plasma discharge.

The electrodeless HID lamp of the present invention can operate at any frequency in the range of 13 Megahertz to 20 Gigahertz at which substantial power can be developed. The operating frequency is typically selected in one of the ISM bands. The frequencies centered around 915 Megahertz and 2.45 Gigahertz are particularly appropriate.

Figure 2:
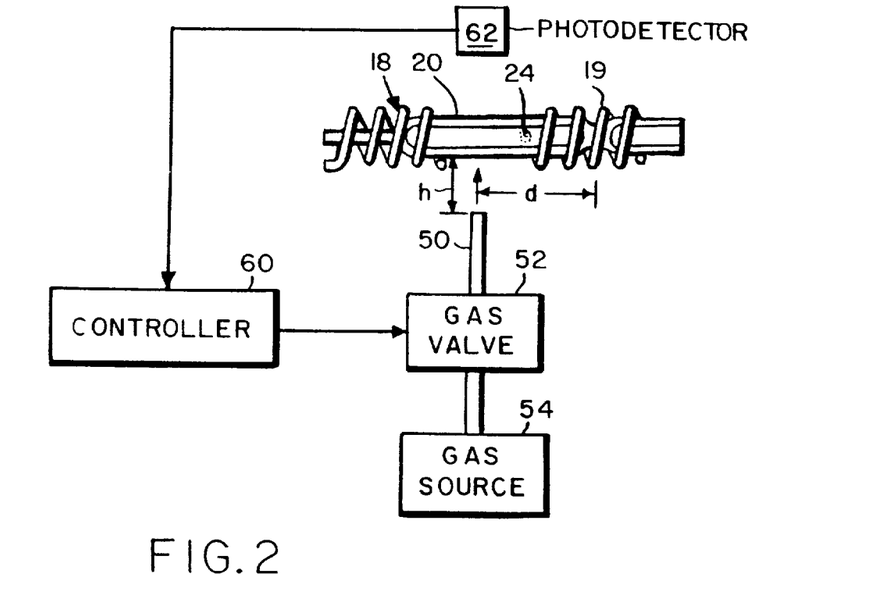
FIG. 2 is a partial schematic diagram of an electrodeless high intensity discharge lamp assembly in accordance with the present invention.
Figure 3:
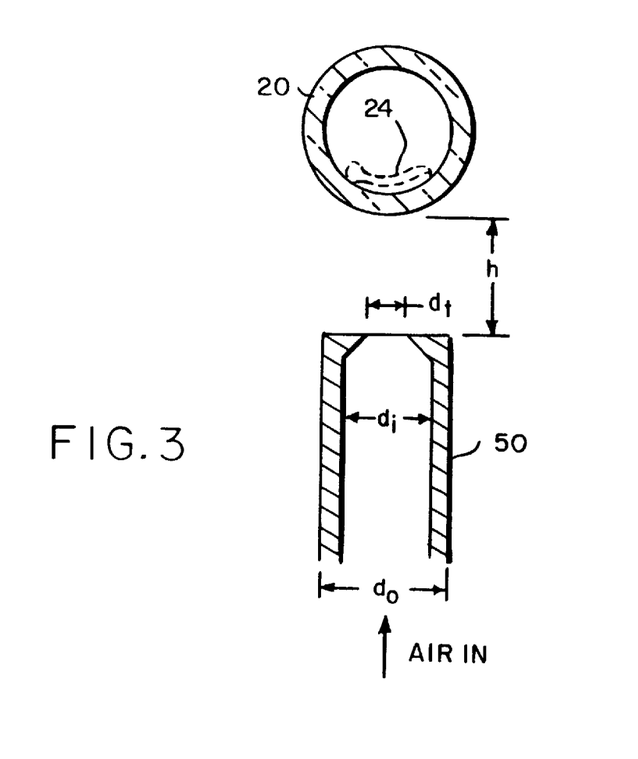
FIG. 3 is an end view of the lamp assembly of FIG. 2, taken along the axis of the lamp capsule.

The present invention relates to a method and system for hot relight of electrodeless HID lamps using momentary forced convective cooling. Rapid cooling of a specific region of the lamp capsule wall condenses volatile components within the lamp capsule and drastically reduces the interior pressure within the lamp capsule. No special high voltage circuitry is necessary, as the discharge is reignited by the conventional applied high frequency field. An example of this approach is shown in FIGS. 2 and 3. Electrodeless lamp capsule 20 is positioned between electric field applicators 18 and 19. The lamp capsule 20 is part of an electrodeless high intensity discharge lamp assembly as shown in FIG. 1. The remainder of the lamp assembly is omitted from FIGS. 2 and 3 for ease of illustration. A gas nozzle 50 may be positioned below the lamp capsule 20 and may be directed toward a bottom region of lamp capsule 20. The nozzle 50 is connected through a gas valve 52 to a gas source 54. The gas source 54 provides gas, typically air, under pressure through nozzle 50 under control of gas valve 52. The gas valve 52 is controlled by controller 60. A photodetector 62 is positioned to sense the light output of lamp capsule 20. An output signal of photodetector 62, representative of the sensed light output of lamp capsule 20, is provided to controller 60.

The operation of the hot relight system of FIG. 2 is generally as follows. High frequency power is removed from a lamp capsule that is operating and hot. The removal of power may be for any reason. The light output from the lamp capsule terminates, and a gas puff is directed toward the hot lamp capsule. The gas puff is a pulse of gas which rapidly cools the lamp capsule to a temperature required for restart. High frequency power is then reapplied to the lamp capsule, and the lamp capsule relights virtually instantly. More specifically, the system of FIG. 2 may operate as follows. The photodetector 62 detects termination of light output from lamp capsule 20 when high frequency power is removed. The controller 60, in response to a signal provided by photodetector 62, provides a control signal to open gas valve 52 and to thereby apply a gas puff through nozzle 50 to lamp capsule 20. When high frequency power is reapplied to the lamp capsule 20, the lamp capsule relights virtually immediately. The photodetector 62 senses reestablishment of light output and provides a signal indicative thereof to controller 60. When the light output of lamp capsule 20 is reestablished, the controller 60 closes valve 52 and terminates the gas puff. Typically, the lamp capsule can be relit in less than one second.

Termination of the gas puff upon relight of lamp capsule 20 has the advantage that the lamp capsule is not cooled by the gas puff after relight. Therefore the lamp capsule reaches its final, steady-state light output more quickly. In general, the gas puff applied to the lamp capsule in accordance with the invention is a limited duration gas pulse and is required to cool the lamp capsule to a temperature that is suitable for restart. Since the user may elect not to reapply power to the lamp, the controller 60 may include a timer which establishes a maximum duration of the gas puff. The timer terminates the gas puff after a timeout period if power is not reapplied to the lamp. The timer may, for example, have a period on the order of 5 seconds. In an alternative approach, the gas puff may have a fixed duration, typically in a range of about 0.5 to 5.0 seconds. The parameters of the gas puff, including its pressure, volume and duration, are selected based on the mass of the lamp capsule and the difference between the normal operating temperature and the temperature required for restart. Lamp capsules with a relatively large mass require longer to cool to a temperature required for restart. The temperature required for restart is typically in a range of about 80° to 140° C. As an alternative to optically sensing the light output of the lamp capsule, termination of light output may be sensed by monitoring the electrical power applied to the lamp.

The gas valve 52 can, for example, be a solenoid valve. Any gas valve of suitable size that is controllable by an electrical signal may be utilized. The controller 60 is an electronic circuit that responds to the output of photodetector 62 and provides a control signal to gas valve 52 as described above. Thus, for example, the controller 60 may include a level detector responsive to the output signal of photodetector 62, a driver for gas valve 52 and a timer for establishing a maximum duration of the gas puff.

The gas source 54 can be a remotely located gas source, or can be a part of the lamp assembly. For example, gas sources are readily available in operating rooms for use with surgical lamps. Likewise, gas sources are frequently available in vehicles for use with vehicle lamps. Alternatively, a dedicated gas source, such as a gas cylinder, may be utilized. Typically, air at a pressure in a range of about 5 to 50 psi and a volume in a range of about 100 to 400 cubic centimeters per gas puff is required. Air or other gases may be utilized within the scope of the present invention.

The gas nozzle 50 can have any desired configuration which directs a gas puff of sufficient volume and pressure toward the lamp capsule 20. In one example, shown in FIG. 3, the nozzle 50 had an outside diameter $d_o$ of 3.18 millimeters and an inside diameter $d_i$ of 1.65 millimeters. The inside diameter was tapered to a diameter $d_t$ at the tip of 1.0 millimeters. The spacing h between the tip of nozzle 50 and lamp capsule 20 is preferably in a range of about 1 to 10 millimeters.

Measurements were made to verify the effectiveness of the hot relight system of the present invention. A lamp capsule having dimensions of 2×3×10 millimeters was filled with 0.947 milligrams mercury, 0.110 milligrams NaScl$_4$ (1.54:1 molar ratio of NaI to Scl$_3$), and 5.0 Torr argon. The lamp was operated at 25 watts and 915 Megahertz. A UV lamp was turned on as a starter to generate initial electrons within the lamp. The output from a 915 Megahertz source was supplied to a circulator. The reflected power from the circulator was attenuated by a 40 dB attenuator and then connected to a crystal detector to monitor reflected power. The overall light level was monitored by a photodiode detector. Signals from the crystal detector and the photodiode were sent to an oscilloscope.

Figure 4:
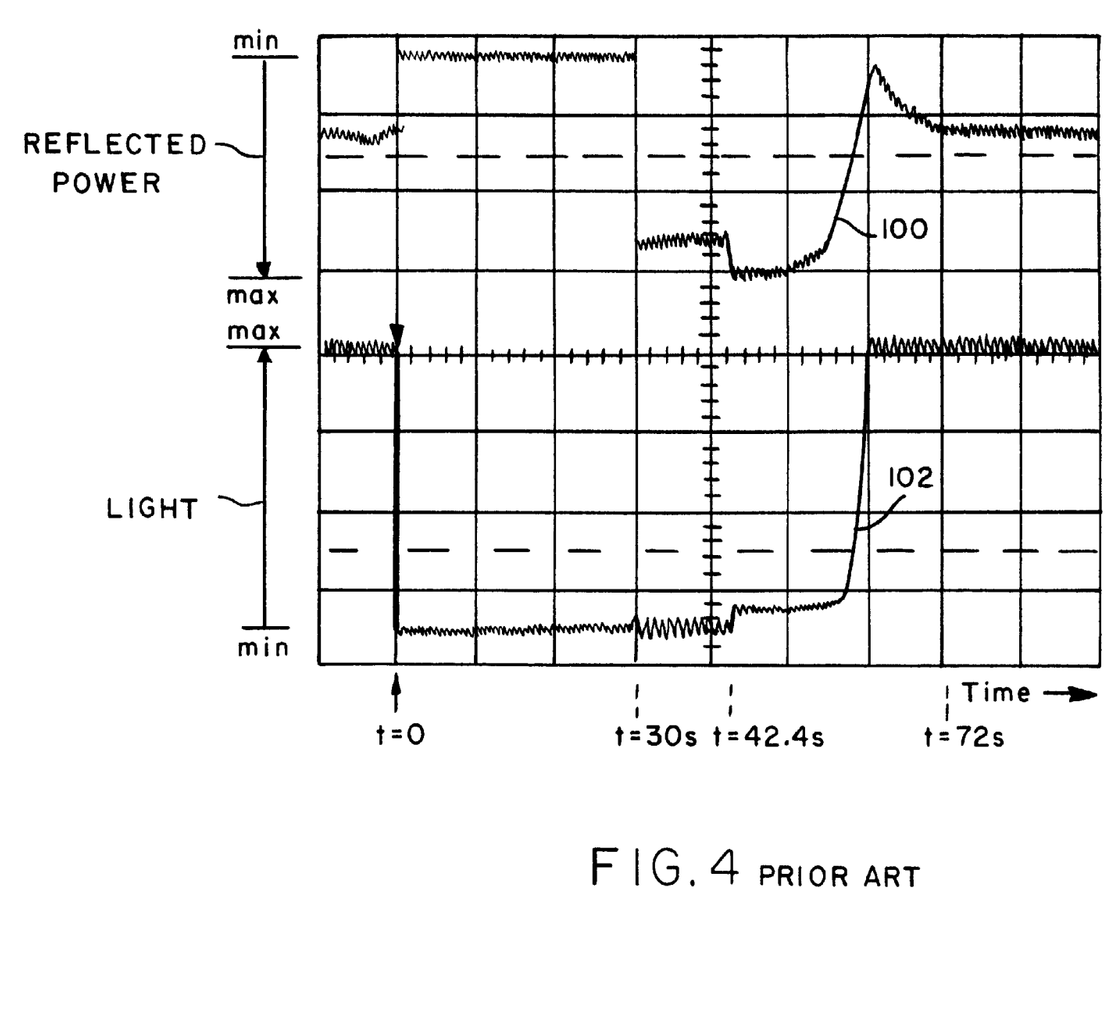
FIG. 4 is a graph of reflected power and light output as a funtion of time utilizing an electrodeless high intensity discharge lamp assembly restarted without the hot relight system of the invention.

The relight time for natural cool-down without air cooling was determined to be 42.4 seconds. Reflected power is shown in FIG. 4 as curve 100, and light output is shown as curve 102. After the lamp ran for at least 10 minutes, the lamp was turned off at time t=0 by shutting off the high frequency source. The reflected power and the light level dropped to a minimum. Microwave power was reapplied at time t=30 seconds, but the lamp did not relight until t=42.4 seconds. A small rise in the light level and a substantial change in the reflected power at t=42.4 seconds indicate the moment of relight. The lamp reached steady state, full light level at about 72 seconds.

Figure 5:
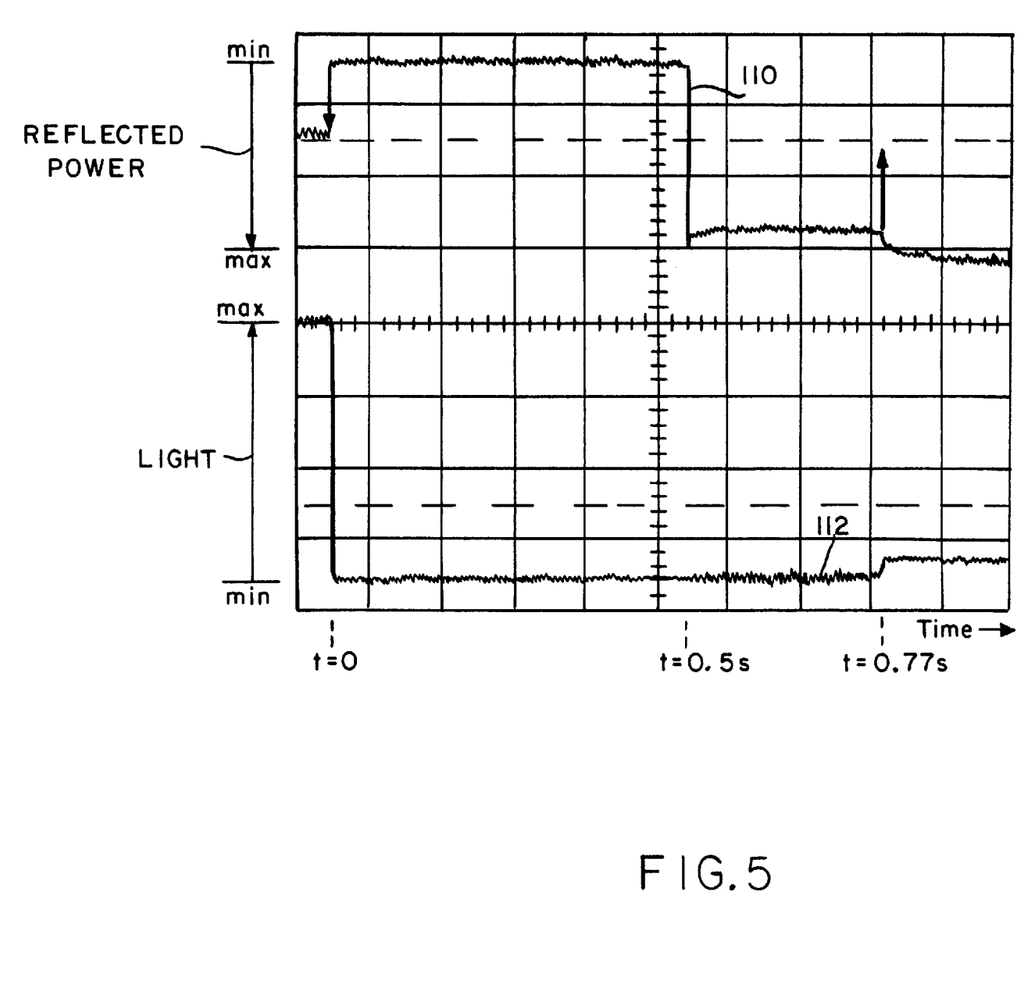
FIG. 5 is a graph of reflected power and light output as a function of time for an electrodeless high intensity discharge lamp assembly restarted with the hot relight system of the invention.

Reflected power with air cooling is shown in FIG. 5 as curve 110, and light output is shown as curve 112. The lamp capsule 20 was relit at t=0.77 seconds in the presence of air cooling at 40 psi. In this case, the nozzle 50 was placed at d=2.8 millimeters and h=3.1 millimeters (see FIG. 2). At t=0, the microwave power was shut off, and the lamp capsule turned off instantly. The reflected power dropped to the minimum level, while the light level dropped from its maximum to its minimum. At the same moment, the gas valve 52 was opened. The gas valve provided room temperature compressed air at 40 psi. At t=0.5 seconds, the microwave power was turned on, but the lamp was still too hot to relight. The moment of relight at 0.77 seconds was indicated by a decrease in reflected power and a rise in the light level. The gas puff was turned off at t=0.8 second. The discharge first restarted when there was a sharp change in the reflected power, and then the light increased as the lamp attained full temperature.

Figure 6:
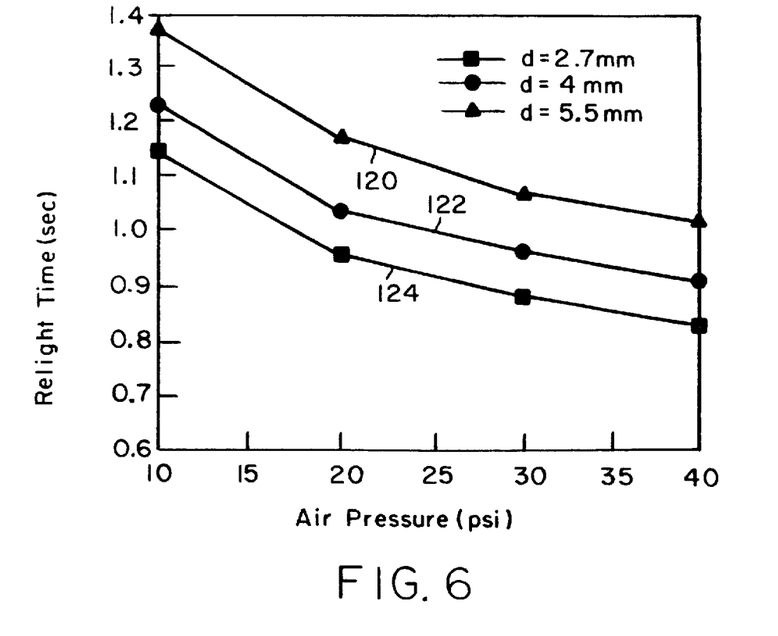
FIG. 6 is a graph of relight time as a function of air pressure for different positions of the gas nozzle relative to the lamp capsule.

In FIG. 6, the relight time is shown as a function of air pressure and nozzle position d, with h=3.4 millimeters (see FIG. 2). The parameter d represents the distance between the support stem end of the lamp capsule and the spot where the gas puff impinges on the lamp capsule. Curves 120, 122 and 124 represent values of distance d of 5.5 mm, 4 mm and 2.7 mm, respectively. A relight time of less than 1.5 seconds is achieved for all situations. The cooling is very effective at a pressure of 10 psi. As the pressure increases from 10 to 40 psi, the relight time decreases by about 25%. The relight time gets shorter as d decreases (i.e, the nozzle 50 is directed to spots closer to the support stem of the lamp capsule). The temperature is lower for small values of d. When the cold spot temperature is lower, more mercury and salt condense. The vapor pressure within the lamp capsule is then lower, and the lamp can be relit faster.

Figure 7:
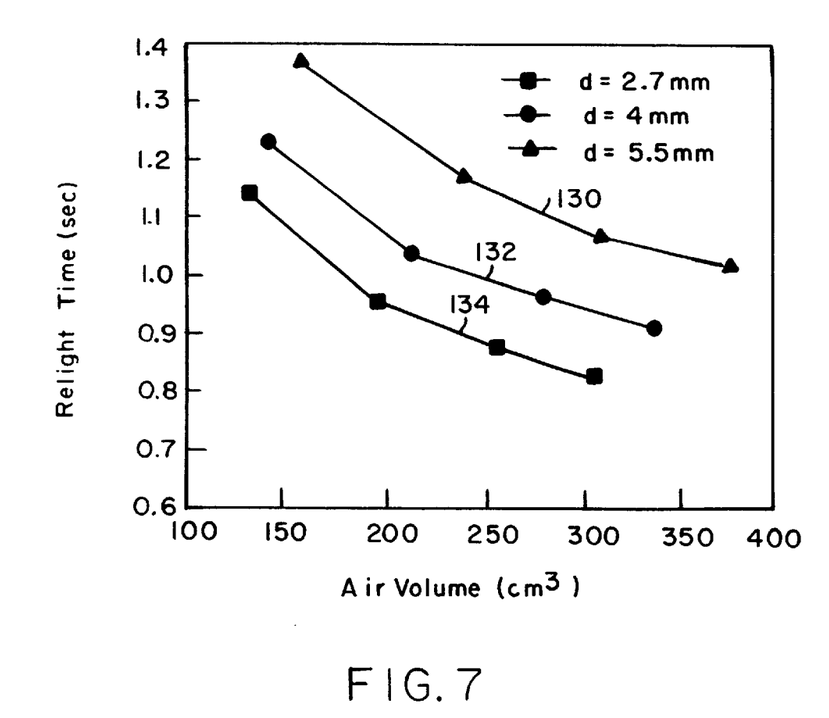
FIG. 7 is a graph of relight time as a function of air volume for different positions of the gas nozzle relative to the lamp capsule.

The air volume for the relight times of FIG. 6 are shown in FIG. 7. Curves 130, 132 and 134 represent values of distance d of 5.5 mm, 4 mm and 2.7 mm, respectively. As more air is used for cooling, the relight time becomes shorter. To achieve the relight time of 0.77 second as shown in FIG. 5, an air volume of 284 cubic centimeters was used. Higher air pressure accelerates relight, but leaves the lamp capsule cooler. In some cases, higher air pressure can result in a slower warmup after relight.

Figure 8:
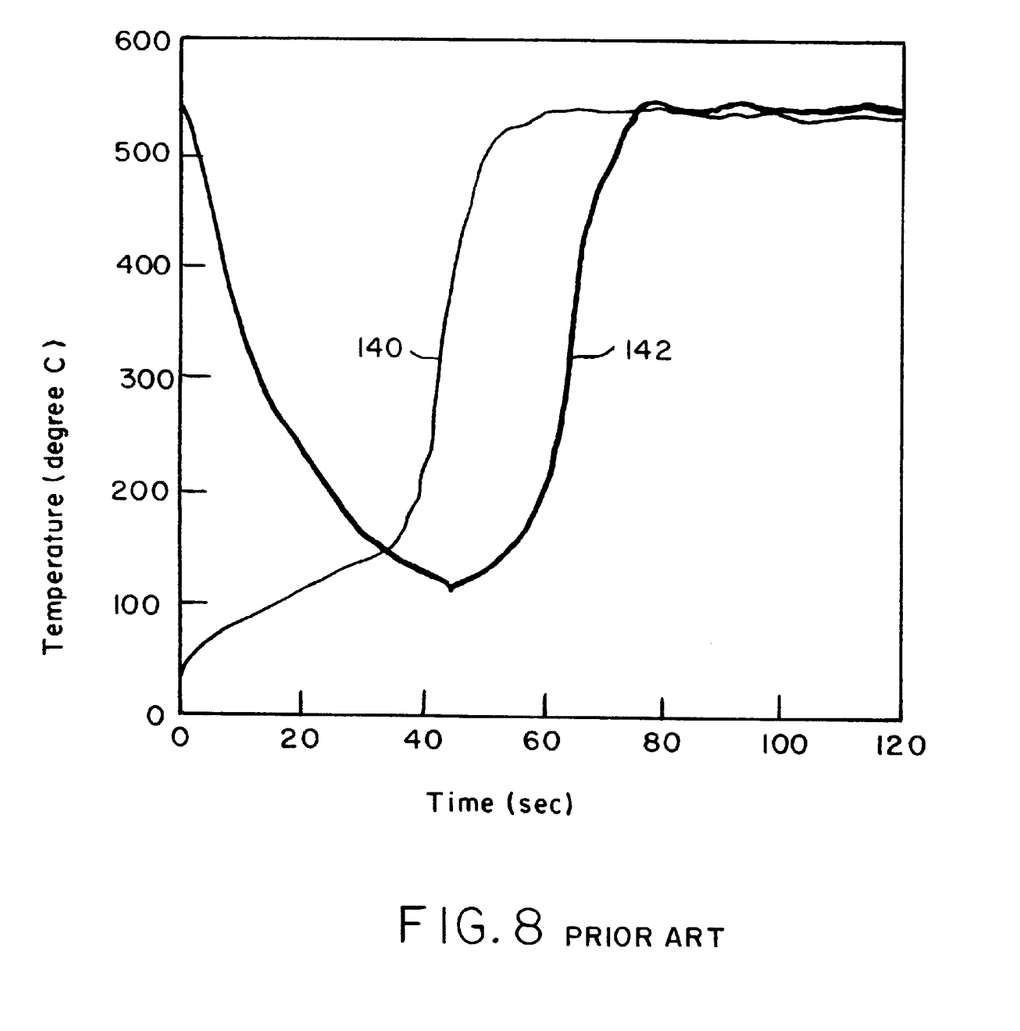
FIG. 8 is a graph of temperature of a portion of an electrodeless lamp capsule as a function of time without the hot relight system of the invention.

The temperature of the lamp capsule was measured by an infrared imaging system aimed at the bottom part of the lamp at a 45° angle. Curve 140 in FIG. 8 represents the temperature of a spot at the bottom of the lamp capsule as a function of time during warmup from a cold start. The lamp was turned on at time t=0. The lamp capsule takes about 60 seconds to reach the steady state temperature of about 540° C. Curve 142 in FIG. 8 represents the temperature at the same spot as a function of time during the operation shown in FIG. 4 and described above. The lamp was turned off at time t=0 and cooled down naturally from steady state operation without cooling air. The temperature at relight (t=42.4 seconds) was about 123° C.

Figure 9:
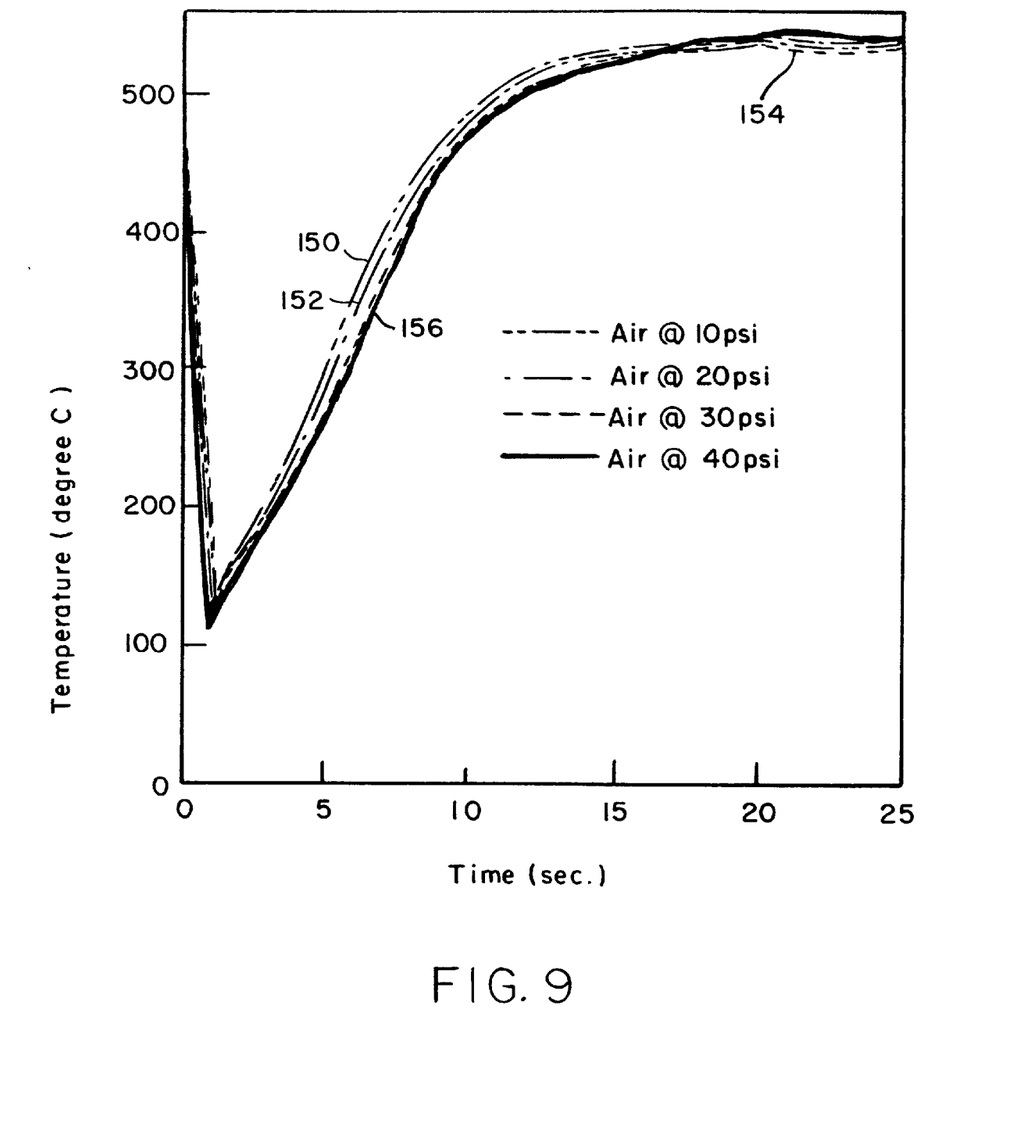
FIG. 9 is a graph of temperature of a portion of an electrodeless lamp capsule as a function of time, with the hot relight system of the invention.
Figure 10:
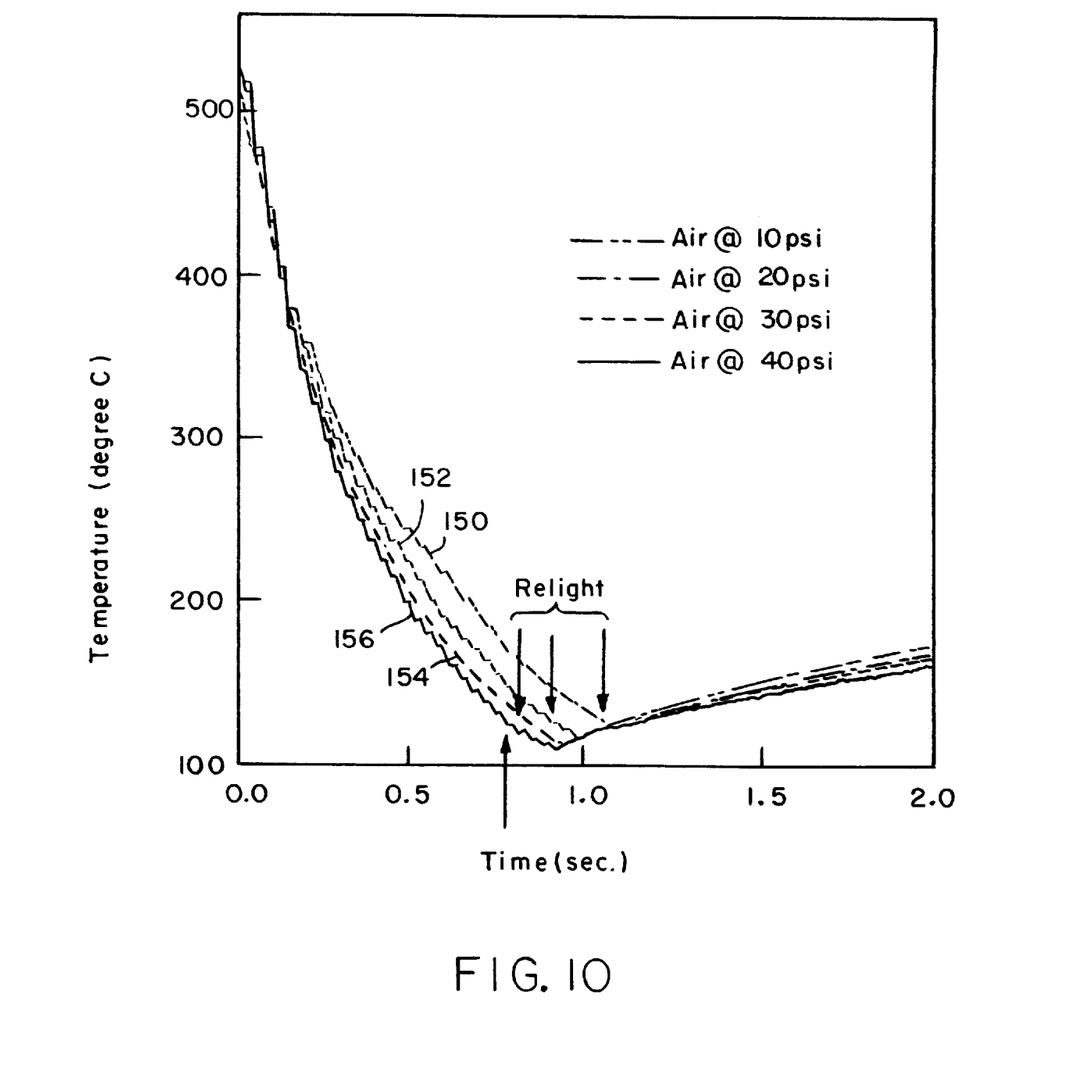
FIG. 10 is a graph of temperature of a portion of the electrodeless lamp capsule as a function of time with the time scale expanded.

The temperature of the same spot as a function of time in the presence of air cooling at pressures of 10 psi (curve 150), 20 psi (curve 152), 30 psi (curve 154) and 40 psi (curve 156) is shown in FIG. 9. The same data is shown in FIG. 10 with an expanded time scale. For all measurements in FIGS. 9 and 10, microwave power is turned off at time t=0 and then is reapplied at time t=0.5 seconds. The gas puff has a duration from t=0 to slightly after the relight (the gas puff is turned off 30 milliseconds after relight). The temperature of the spot is quickly cooled in just one second from the steady state temperature of 540° C. to about 140° C. for air pressure at 10 psi and to below 120° C. for the other air pressures used. It is apparent from FIG. 9 that the temperature differences for air pressures of 10 psi to 40 psi are not significant.

The relight system of the present invention, which involves the application of a gas puff for rapid cooling of the lamp capsule, is described above in connection with electrodeless high intensity discharge lamps. The invention is particularly useful with electrodeless lamps because of their relatively small mass and lack of electrodes. However, the present invention is applicable to electroded high intensity discharge lamps as well. Typically, a gas puff of greater duration and volume may be required for rapid cooling of an electroded discharge lamp to a temperature required for restart. In general, the parameters of the gas puff, including its pressure, volume and duration, are selected to produce cooling of the electroded or electrodeless lamp from its operating temperature to a temperature required for restart in a time that is acceptable for a particular application.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An electrodeless high intensity discharge lamp assembly comprising:
   an electrodeless lamp capsule having an enclosed volume containing a mixture of starting gas and chemical dopant material excitable by high frequency power to a state of luminous emission;
   an applicator for coupling high frequency power to said lamp capsule;
   a gas nozzle directed toward said lamp capsule;
   a control circuit for sensing said state of luminous emission; and
   a gas controller coupled to said gas nozzle for receiving gas from a gas source and for supplying a gas puff of limited duration to said lamp capsule through said gas nozzle after termination of said state of luminous emission and in response to said control circuit, wherein said lamp capsule is rapidly cooled by said gas puff to a temperature required for restart, and said gas puff is terminated upon relight.

2. An electrodeless high intensity discharge lamp assembly as defined in claim 1, wherein said gas controller comprises a gas valve coupled between said gas nozzle and said gas source and responsive to a control signal supplied by said control circuit.

3. An electrodeless high intensity discharge lamp assembly as defined in claim 2, wherein said control circuit includes a photodetector for sensing said state of luminous emission and means responsive to said photodetector sensing termination of said state of luminous emission for initiating said gas puff.

4. An electrodeless high intensity discharge lamp assembly as defined in claim 3, wherein said control circuit further includes means for terminating said gas puff in response to said photodetector sensing reestablishment of said state of luminous emission.

5. An electrodeless high intensity discharge lamp assembly as defined in claim 3, wherein said control circuit further includes a timer for terminating said gas puff a predetermined time after initiation thereof.

6. An electrodeless high intensity discharge lamp assembly as defined in claim 1 wherein said gas nozzle is directed toward a region of said lamp capsule where said chemical dopant material condenses.

7. An electrodeless high intensity discharge lamp assembly as defined in claim 1, wherein said gas nozzle is directed toward a bottom region of said lamp capsule.

8. An electrodeless high intensity discharge lamp assembly as defined in claim 1, wherein said gas puff has a pressure in a range of about 5 to 50 pounds per square inch.

9. An electrodeless high intensity discharge lamp assembly as defined in claim 1, wherein said gas nozzle is spaced from said lamp capsule by a distance in a range of about 1 to 10 millimeters.

10. An electrodeless high intensity discharge lamp assembly as defined in claim 1, wherein said gas puff has a time duration in a range of about 0.5 to 5 seconds.

11. An electrodeless high intensity discharge lamp assembly as defined in claim 1, wherein the parameters of said gas puff are selected to reduce the temperature of said lamp capsule to the temperature required for restart in a predetermined time.

12. In an electrodeless high intensity discharge lamp assembly comprising an electrodeless lamp capsule having an enclosed volume containing a mixture of starting gas and chemical dopant material excitable by high frequency power to a state of luminous emission and an applicator for coupling high frequency power to said lamp capsule, a method for facilitating hot restart of said lamp capsule comprising the step of:

sensing said state of luminous emission by means of a control circuit, and directing a gas puff of limited duration toward said lamp capsule after termination of said state of luminous emission in response to said control circuit, wherein said lamp capsule is rapidly cooled by said gas puff to a temperature required for restart and terminating said gas puff upon relight.

13. A method as defined in claim 12 wherein the step of directing a gas puff further includes terminating said gas puff in response to sensing reestablishment of said state of luminous emission.

14. A method as defined in claim 1 wherein the step of directing a gas puff further includes terminating said gas puff a predetermined time after initiation thereof.

15. An electrodeless high intensity discharge lamp assembly comprising:

an electrodeless lamp capsule having an enclosed volume containing a mixture of starting gas and chemical dopant material excitable by high frequency power to a state of luminous emission;

an applicator for coupling high frequency power from a high frequency source to said lamp capsule;

a control circuit for sensing said state of luminous emission; and means for directing a gas puff of limited duration toward said lamp capsule after termination of said state of luminous emission and in response to said control circuit, wherein said lamp capsule is rapidly cooled by said gas puff to a temperature required for restart, and said gas puff is terminated upon relight.

16. An electrodeless high intensity discharge lamp assembly as defined in claim 15 wherein said means for directing a gas puff comprises a gas nozzle directed toward said lamp capsule, a gas valve coupled between said gas nozzle and a gas source and responsive to a control signal.

17. An electrodeless high intensity discharge lamp assembly as defined in claim 16 wherein said control circuit includes a photodetector for sensing said state of luminous emission and means responsive to said photodetector for sensing termination of said state of luminous emission for initiating said gas puff.

18. An electrodeless high intensity discharge lamp as defined in claim 17 wherein said control circuit further includes means for terminating said gas puff in response to said photodetector sensing reestablishment of said state of luminous emission.

19. An electrodeless high intensity discharge lamp as defined in claim 15 wherein said gas puff has a pressure in a range of about 5 to 50 pounds per square inch.

20. An electrodeless high intensity discharge lamp as defined in claim 15 wherein said gas puff has a time duration in a range of about 0.5 to 5.0 seconds.

* * * * *